United States Patent
Koyagi et al.

(10) Patent No.: US 7,083,405 B2
(45) Date of Patent: Aug. 1, 2006

(54) PHOTO-FABRICATION APPARATUS

(75) Inventors: Yasuyuki Koyagi, Kyoto (JP); Hiroko Shimozuma, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 213 days.

(21) Appl. No.: 10/759,134

(22) Filed: Jan. 20, 2004

(65) Prior Publication Data

US 2004/0160590 A1    Aug. 19, 2004

(30) Foreign Application Priority Data

Feb. 19, 2003    (JP)    ............................ P2003-040459

(51) Int. Cl.
*B28B 17/00*    (2006.01)
(52) U.S. Cl. .................... 425/174.4; 425/160; 264/401
(58) Field of Classification Search ............ 425/174.4, 425/375, 160; 264/401, 308
See application file for complete search history.

(56) References Cited

U.S. PATENT DOCUMENTS

| 4,971,443 | A | * | 11/1990 | Koyagi | ........................ 356/623 |
| 5,172,262 | A | * | 12/1992 | Hornbeck | .................... 359/223 |
| 6,051,179 | A | * | 4/2000 | Hagenau | ..................... 264/401 |
| 6,500,378 | B1 | | 12/2002 | Smith | |
| 6,738,104 | B1 | * | 5/2004 | Marshall | ...................... 348/743 |

2002/0164069 A1    11/2002    Nagano et al.

FOREIGN PATENT DOCUMENTS

| JP | 2001-252986 | 9/2001 |
| JP | 2002-316363 | 10/2002 |
| JP | 2003-66249 | 3/2003 |
| JP | 2003-340923 | 12/2003 |
| WO | WO 98/06560 | 2/1998 |

* cited by examiner

*Primary Examiner*—Robert Davis
*Assistant Examiner*—G. Nagesh Rao
(74) *Attorney, Agent, or Firm*—McDermott Will & Emery LLP

(57)    ABSTRACT

A photo-fabrication apparatus comprises a stage for holding a photosensitive member which is a substrate coated with a photosensitive material, a head part for emitting a spatially-modulated light beam to said photosensitive member and a computer. The head part has a DMD having a plurality of micromirrors arranged in a two-dimensional array, and a light beam from a light source is reflected on only some of the group of micromirrors in the DMD which have a predetermined tilt angle and led onto the photosensitive member. In the photo-fabrication apparatus, the tilt angle of each micromirror in the DMD is controlled by the computer. This can control the quantity of irradiation light for an irradiation region on the photosensitive member corresponding to each micromirror, to perform an exposure in accordance with a three-dimensional shape of a desired object for a short time. The exposed photosensitive member is developed by another apparatus.

15 Claims, 9 Drawing Sheets

PHOTO-FABRICATION APPARATUS

BACKGROUND OF THE INVENTION

1. Field of the Invention

The present invention relates to a photo-fabrication apparatus for performing three-dimensional fabrication by irradiating a photosensitive material with light.

2. Description of the Background Art

Photofabrication has been conventionally performed, where 3D (three-dimensional) shape data of an object is sliced to obtain a plurality of cross-sectional data (i.e., 2D (two-dimensional) shape data) and while photocurable liquid resins are laminated, each of laminated layers is irradiated (exposed) with light on the basis of the corresponding cross-sectional data to fabricate a desired 3D model.

Japanese Patent Application Laid Open Gazette No. 2001-252986 discloses a technique to fabricate a 3D model by irradiating a photocurable liquid resin with light which is spatially modulated by a liquid crystal mask without laminating the photocurable liquid resin.

Since the conventional photofabrication, however, needs repeating lamination of the photocurable liquid resins and light irradiation, both time and cost for fabrication of physical models increase. The technique disclosed in Japanese Patent Application Laid Open Gazette No. 2001-252986 disadvantageously deteriorates the accuracy in shape of physical model due to ill effect of lines between pixels of the liquid crystal mask and even in a case of fabrication of relatively large physical models, as the number of pixels is limited, the accuracy in shape of physical model is deteriorated. This technique further has a problem of deterioration in efficiency of light irradiation due to liquid crystal.

SUMMARY OF THE INVENTION

The present invention is intended for a photo-fabrication apparatus which performs three-dimensional fabrication by irradiating a photosensitive material with light, and it is an object of the present invention to perform three-dimensional fabrication for a short time or with high accuracy of shape.

According to one preferred embodiment of the present invention, the photo-fabrication apparatus comprises a light source; a spatial light modulator having a plurality of micromirrors arranged in a two-dimensional array, for spatially modulating light received from the light source by individually changing tilt angles of the plurality of micromirrors; a holding part for holding a photosensitive material to be irradiated with light which is spatially modulated by the spatial light modulator; and a controller for controlling tilt angles of the plurality of micromirrors to control a quantity of irradiation light for each of a group of irradiation regions on the photosensitive material among more than two levels. The group of irradiation regions corresponds to the plurality of micromirrors.

The above photo-fabrication apparatus can efficiently perform an exposure of the photosensitive material for three-dimensional fabrication for a short time with a plurality of micromirrors and improve the accuracy of shape of a physical model obtained after development by controlling the quantity of irradiation light for each exposure region among more than two levels.

According to another preferred embodiment of the present invention, the photo-fabrication apparatus comprises a spatial light modulator for generating spatially-modulated light; a holding part for holding a photosensitive material to be irradiated with light which is spatially modulated by the spatial light modulator; a moving mechanism for moving a group of irradiation regions on a photosensitive material relatively to the photosensitive material, each of the group of irradiation regions corresponding to an element of modulation; and a controller for controlling the spatial light modulator in synchronization with a relative movement of the group of irradiation regions to control a cumulative quantity of irradiation light emitted to each of exposure regions defined on the photosensitive material among more than two levels while a plurality of irradiation regions pass the each of exposure regions.

The above photo-fabrication apparatus can improve the accuracy of shape of a physical model obtained after development by controlling the quantity of irradiation light for each exposure region among more than two levels and further allow a wide-range exposure for three-dimensional fabrication on the photosensitive material with the moving mechanism.

Preferably, the group of irradiation regions are arranged at regular intervals in two directions which are orthogonal to each other and a distance in a direction orthogonal to the relative movement direction between irradiation regions on both ends in a row along the one array direction is smaller than a pitch of the group of irradiation regions in the other array direction. This allows easy control of the spatial light modulator and an exposure with high accuracy.

According to still another preferred embodiment of the present invention, the photo-fabrication apparatus comprises a light source unit for emitting modulated light; a holding part for holding a photosensitive material to be irradiated with light from the light source unit; a moving mechanism for moving an irradiation region irradiated with light emitted from the light source unit relatively to a photosensitive material; and a controller for controlling the light source unit in synchronization with a relative movement of the irradiation region to control the cumulative quantity of irradiation light for each of exposure regions defined on the photosensitive material among more than two levels.

The above photo-fabrication apparatus can improve the accuracy of shape of a physical model obtained after development by controlling the quantity of irradiation light for each exposure region among more than two levels and further allow a wide-range exposure for three-dimensional fabrication on the photosensitive material with the moving mechanism.

Preferably, in each of the above-mentioned apparatuses, the controller comprises a memory for storing shape data on a three-dimensional shape of an object and a table substantially indicating a relation between a quantity of irradiation light for one exposure region on a photosensitive material and an exposed depth of the photosensitive material; and an electronic circuit for obtaining the quantity of irradiation light for each of exposure regions defined on the photosensitive material, which is an element of exposure, on the basis of the shape data and the table.

Further preferably, the photo-fabrication apparatus further comprises a measuring device, and in the photo-fabrication apparatus, a plurality of exposure regions are irradiated with light of different exposure values and the measuring device measures heights of a photosensitive material which is developed after irradiation, at the plurality of exposure regions, and the controller makes the table on the basis of the exposure values and the heights of photosensitive material at the plurality of exposure regions. This makes it possible to make a table with high accuracy.

These and other objects, features, aspects and advantages of the present invention will become more apparent from the

DESCRIPTION OF THE PREFERRED EMBODIMENTS

Figure 1:
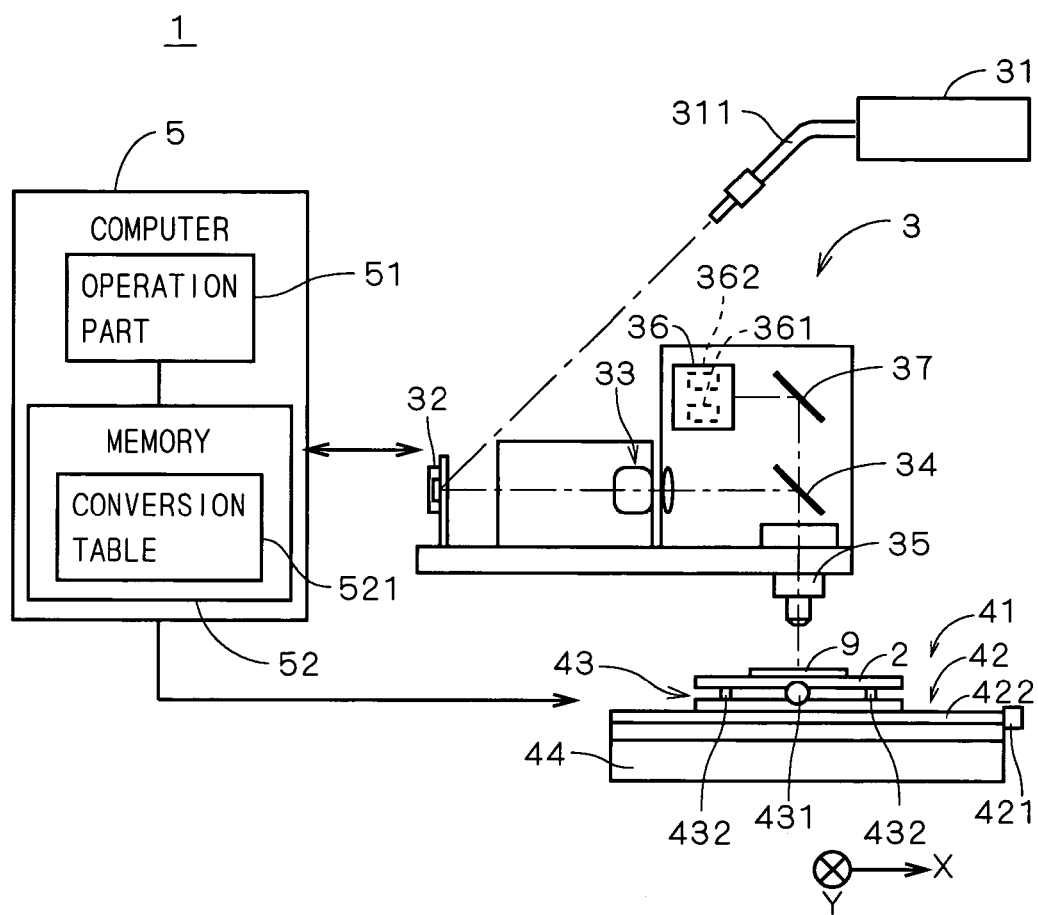
FIG. 1 is a view showing a construction of a photo-fabrication apparatus in accordance with a first preferred embodiment.

FIG. 1 is a view showing a construction of a photo-fabrication apparatus 1 in accordance with the first preferred embodiment of the present invention. The photo-fabrication apparatus 1 is an apparatus for irradiating a member with light in accordance with a 3D (three-dimensional) shape of a designed object (designed surface). The member is prepared in advance by coating a predetermined substrate with photosensitive resist which is a positive-type photosensitive material to have a predetermined film thickness and drying the coated substrate (hereinafter, the member is referred to simply as a "photosensitive member"). The exposed photosensitive member is developed in a later process to become a 3D physical model (3D physical surface).

The photo-fabrication apparatus 1 has a stage 2 for holding a photosensitive member 9, a head part 3 which is a unit for emitting a spatially-modulated light beam toward the photosensitive member 9, a stage moving mechanism 41 for moving the stage 2 relatively to the head part 3 and a stage up-and-down mechanism 44 for hoisting and lowering the stage 2.

The head part 3 has a light source 31 provided with a semiconductor laser for emitting a light beam (e.g., having a wavelength of about 400 nm) and a micromirror array 32 in which a plurality of micromirrors are arranged in a 2D (two-dimensional) array (such as a DMD (digital micromirror device), hereinafter the array is referred to as a "DMD 32"), and the light beam from the light source 31 is spatially modulated by the DMD 32 and then emitted onto the photosensitive member 9.

Specifically, the light beam emitted from an optical fiber 311 which is connected to the light source 31 is guided to the DMD 32 by a not-shown optical system. From the DMD 32, a light beam is led out, which is formed only of reflected light beam elements on some of the micromirrors which have a predetermined tilt angle (in other words, have an orientation corresponding to an ON state in later discussion on light irradiation by the DMD 32). The light beam from the DMD 32 is guided to a half mirror 34 through a lens group 33 and the light beam reflected on the half mirror 34 is guided to a surface of the photosensitive member 9 through an objective lens 35.

The head part 3 has an autofocus detection unit (hereinafter, referred to as an "AF detection unit") 36 for detecting a distance between the objective lens 35 and the surface of the photosensitive member 9. The AF detection unit 36 has a semiconductor laser 361 for emitting a laser beam and a light receiving part 362 for receiving a reflected light from the photosensitive member 9, and the laser beam emitted from the semiconductor laser 361 is reflected on a mirror 37 and applied to the surface of the photosensitive member 9 through the half mirror 34 and the objective lens 35. The reflected laser beam from the photosensitive member 9 is guided to the AF detection unit 36 through the objective lens 35, the half mirror 34 and the mirror 37, and the AF detection unit 36 detects the distance between the objective lens 35 and the surface of the photosensitive member 9 from a position where the light receiving part 362 receives the reflected light.

The stage moving mechanism 41 has an X-direction moving mechanism 42 for moving the stage 2 in the X direction of FIG. 1 and a Y-direction moving mechanism 43 for moving the stage 2 in the Y direction. A motor 421 and a ball screw (not shown) are connected to the X-direction moving mechanism 42, and with rotation of the motor 421, the Y-direction moving mechanism 43 moves in the X direction of FIG. 1 along guide rails 422. The Y-direction moving mechanism 43 has the same constitution as the X-direction moving mechanism 42, and with rotation of a motor 431, the stage 2 is moved by a ball screw (not shown) in the Y direction along guide rails 432. The stage moving mechanism 41 is supported by the stage up-and-down mechanism 44 having a motor, and by driving the stage up-and-down mechanism 44, a distance between the objective lens 35 and the stage 2 is changed.

The photo-fabrication apparatus 1 further has a computer 5 constituted of a CPU for performing various information processing, a memory for storing various pieces of information and the like, and the function of an operation part 51 is implemented with electronic circuits such as the CPU and various pieces of information are stored in a memory 52. The computer 5 is connected to the head part 3, the stage moving mechanism 41, the stage up-and-down mechanism 44 and serves as a controller to perform light irradiation (exposure) for 3D fabrication in the photo-fabrication apparatus 1.

Figure 2:
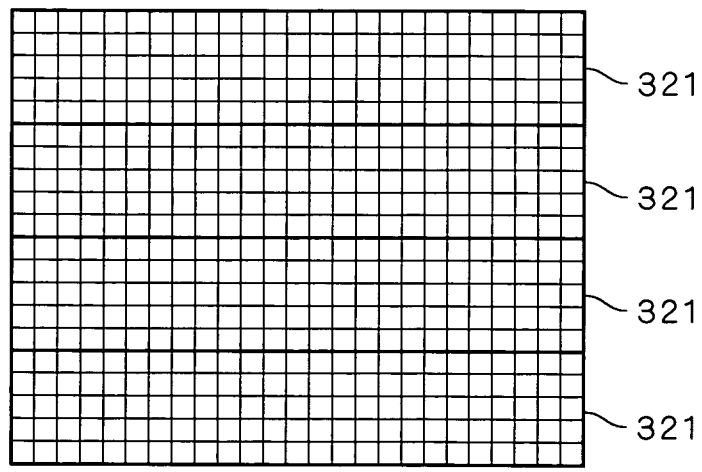
FIG. 2 is a schematic view showing a DMD.

FIG. 2 is a schematic view showing the DMD 32. The DMD 32 has a plurality of blocks 321 each having a number of micromirrors which are arranged at regular intervals in two directions orthogonal to each other (row and column directions) and the blocks 321 are arranged in one direction (e.g., in the column direction). In a practical case, the micromirrors more than those shown in FIG. 2 are arranged in the row and column directions in each block 321. In the DMD 32, data are written into memory cells corresponding to the micromirrors by block 321, and in response to input of a reset pulse, some of the micromirrors are simultaneously inclined at a predetermined angle.

Specifically, data indicating ON or OFF for each micromirror (hereinafter, the data is referred to as "DMD cell data") is transmitted to the DMD 32 from the computer 5 of FIG. 1 and written into a memory cell, and a tilt angle of the micromirror is switched between ON state and OFF state in accordance with the DMD cell data in synchronization with the reset pulse. The light beam emitted to the DMD 32 is reflected in accordance with the tilt directions of the micromirrors and light irradiation of an irradiation region on the photosensitive member 9 corresponding to each micromirror is turned ON or OFF. The light beam element entering the micromirror of ON state is reflected to the lens group 33 and emitted to the corresponding irradiation region on the photosensitive member 9. The light beam element entering the micromirror of OFF state is reflected to a predetermined position different from the lens group 33 and no light is led to the corresponding irradiation region.

Transmission of the reset pulse from the computer 5 to the DMD 32 is repeated a predetermined number of times for every given period of time, and by precisely controlling the number of times of ON state of each micromirror (in other words, the cumulative time of ON state of each micromirror), the quantity of irradiation light for each irradiation region is controlled among more than two levels (this control is also referred to as "multi-level (gray-scale) control"). The reset pulse does not need to be generated at regular intervals, and the multi-level control may be performed, for example, by dividing a unit time into time frames of 1:2:4:8:16 and transmitting the reset pulse one time at the first of each time frame (in this case, the quantity of irradiation light is controlled at 32 levels).

Figure 3:
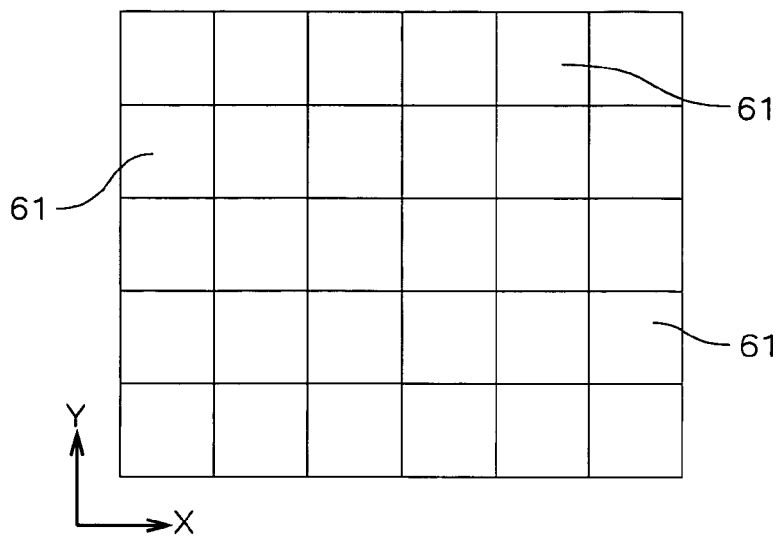
FIG. 3 is a view showing an irradiation region group.

FIG. 3 is a view showing some of a group of irradiation regions 61 on the photosensitive member 9. One irradiation region 61 is a rectangular region corresponding to a shape of each micromirror in the DMD 32 and the irradiation regions 61 are arranged in the X direction and the Y direction of FIG. 3 at predetermined pitches, respectively. In the preferred embodiment, the irradiation regions are fixed onto the photosensitive member 9 and each irradiation region 61 is one exposure region which is an element of exposure on the photosensitive member 9.

Figure 4:
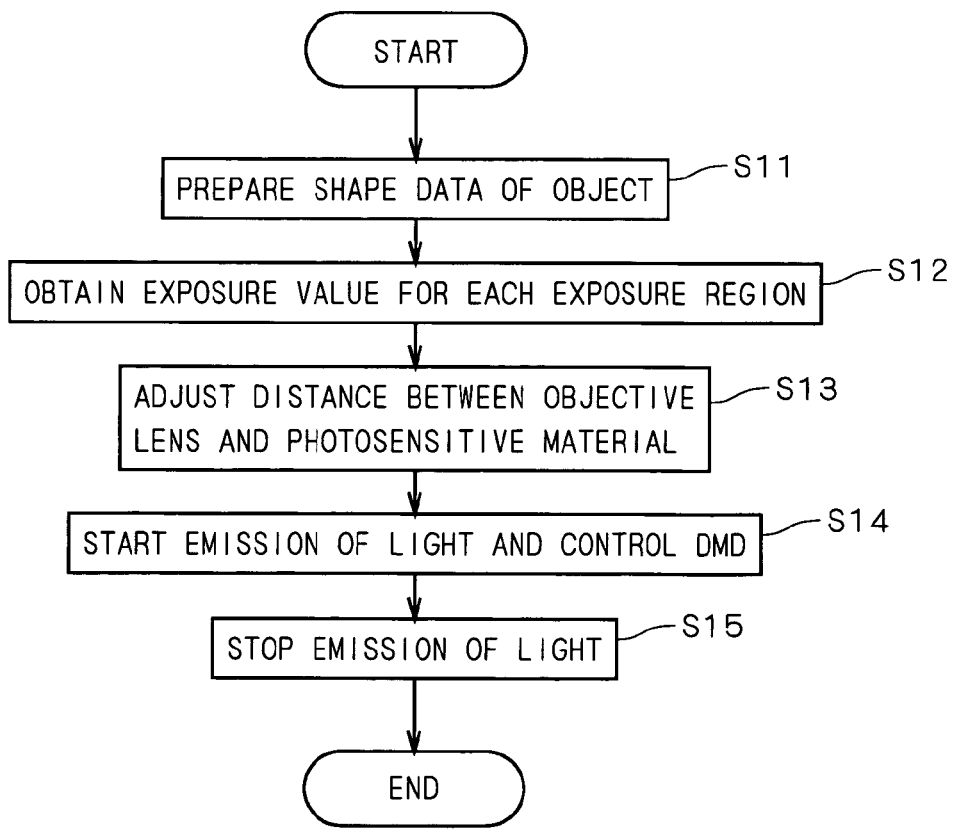
FIG. 4 is a flowchart showing an operation flow of exposure for 3D (three-dimensional) fabrication.

FIG. 4 is a flowchart showing an operation flow of the photo-fabrication apparatus 1 for irradiating the photosensitive member 9 with light for 3D fabrication (hereinafter, the operation is referred to as "exposure operation"). First, data indicating a 3D shape of a desired designed object (or designed surface) is prepared (Step S11). The shape data is data indicating the 3D shape of the designed object, which is obtained by linking a cell which is one exposure region on the photosensitive member 9 with height information, and the shape data is generated in advance from 3D information such as 3D CAD data and stored in the memory 52 of the photo-fabrication apparatus 1. The shape data may be generated by the operation part 51 on the basis of the 3D information.

In the photo-fabrication apparatus 1, a conversion table 521 indicating a relation between the quantity of irradiation light for one exposure region on the photosensitive member 9 and the depth of the photosensitive resist to be removed by development to the exposure region which is irradiated with the light (in other words, the depth of photosensitive resist to be exposed, and hereinafter, the depth is referred to as an "exposed depth") is made in advance in a conversion table making operation as discussed later and stored in the memory 52 (see FIG. 1), and the quantity of irradiation light (hereinafter, referred to as "exposure value") for each exposure region is obtained in the operation part 51 on the basis of the shape data and the conversion table 521.

Figure 5:
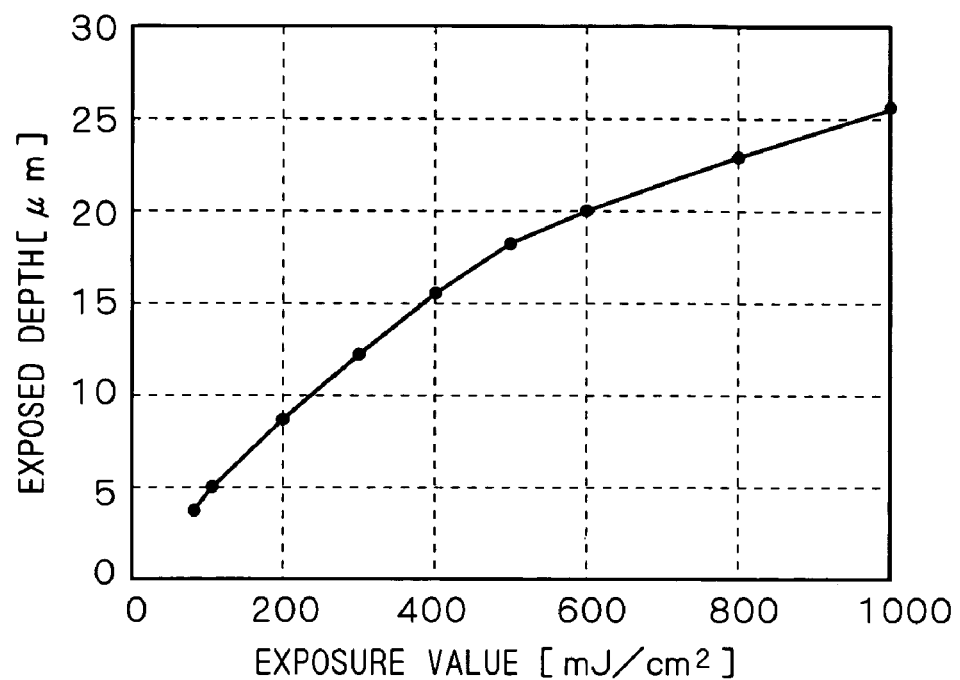
FIG. 5 is a graph showing a relation between an exposed depth and an exposure value.

FIG. 5 sequentially shows the conversion table 521 in graph, and the vertical axis indicates an exposed depth and the horizontal axis indicates an exposure value per unit area. From FIG. 5, it is found that as the exposure value becomes larger, the exposed depth increases. The operation part 51 determines the exposed depth of each exposure region from the information of height for each cell in the shape data and obtains the exposure value corresponding to the exposed depth for each exposure region on the basis of the conversion table 521. Then, from the exposure value for each exposure region generated is a set of DMD cell data corresponding to reset pulses for a given period of time.

The shape data contains information indicating height (e.g., a height from the substrate and hereinafter this height is referred to as "reference height") which requires the highest accuracy of shape in a designed object. In the photo-fabrication apparatus 1, the stage up-and-down mechanism 44 is adjusted so that a position where luminous fluxes from the micromirrors of ON state are focused in the photosensitive member 9 (hereinafter, the position is referred to as "focus position") may coincide with the reference height of the photosensitive member 9, and the distance between the objective lens 35 and the photosensitive member 9 is thereby controlled (Step S13). At that time, the distance between the objective lens 35 and the surface of the photosensitive member 9 is detected by the AF detection unit 36 and can be thereby precisely controlled.

Subsequently, the computer 5 controls the light source 31 to start emission of light and controls the DMD 32 (Step S14). For control of the DMD 32, first, the computer 5 writes the first DMD cell data into a memory cell corresponding to each micromirror in the DMD 32. Then, with transmission of the reset pulse from the computer 5 to the DMD 32, each micromirror inclines at a tilt angle in accordance with the data in the memory cell and the first exposure (which is a control of irradiation or not) is performed for the corresponding exposure region.

Immediately after transmission of the reset pulse, the next DMD cell data is written into the memory cell corresponding to each micromirror. With the second reset pulse from the computer 5, each micromirror inclines at a tilt angle in accordance with the data in the memory cell. In the photo-fabrication apparatus 1, by repeating the writing of the DMD cell data and the transmission of the reset pulse, the cumulative time of ON state of each micromirror is precisely controlled and the cumulative quantity of irradiation light for each exposure region thereby becomes the exposure value which is obtained in Step S12.

After a predetermined number of transmissions of the reset pulse are finished, emission of light from the light source 31 is stopped (Step S15). The photosensitive member 9 which is exposed through the above operation is developed by an apparatus outside the photo-fabrication apparatus 1, and the photosensitive resist is removed by the depth in accordance with the cumulative quantity of light for each exposure region. This completes a physical model having a desired 3D shape (or 3D surface).

Next, an operation for making the conversion table 521 will be discussed. In making the conversion table 521, a plurality of rectangular regions are defined in advance on a photosensitive member 9 for making the table and sets of DMD cell data are generated, having different exposure values for the exposure regions depending on the rectangular regions. Then, like in Step S14, the photosensitive member 9 is exposed in accordance with the DMD cell data. The rectangular regions are thereby irradiated with lights of different quantities per unit area. At that time, the stage 2 is moved up or down in advance so that the focus position may become a predetermined position with respect to the photosensitive member 9, and the distance between the objective lens 35 and the surface of the photosensitive member 9 in exposure (hereinafter, referred to as "distance in exposure") is stored in the memory 52.

The photosensitive resist of the exposed photosensitive member 9 is developed by an outside developing apparatus and the developed photosensitive member 9 is returned to the photo-fabrication apparatus 1. In the photo-fabrication apparatus 1, the height of the stage 2 is made the same as that in exposure. Then, one of a plurality of rectangular regions is moved to an irradiation position of laser beam from the AF detection unit 36 and the distance between the rectangular region and the objective lens 35 (hereinafter, referred to as "distance after development") is detected. Also with respect to the other rectangular regions, respective distances after development are detected.

The operation part 51 calculates a difference between the distance after development and the distance in exposure with respect to each rectangular region (in other words, a difference of heights before and after development with respect to each rectangular region) as an exposed depth and links the exposure value per unit area and the exposed depth with respect to each rectangular region with each other to make the conversion table 521 with high accuracy. This allows light irradiation for 3D fabrication with high accuracy in the photo-fabrication apparatus 1. A measuring device for measuring the height of a rectangular region which is developed after the irradiation with lights of different quantities is not limited to the AF detection unit 36 but may be a probe-type measuring device or the like, which is separately provided.

Thus, in the photo-fabrication apparatus 1, the computer 5 controls the DMD 32 having a plurality of micromirrors to individually change tilt angles of the micromirrors and control the quantity of irradiation light for an irradiation region 61 corresponding to each micromirror. This makes it possible to perform a multi-level exposure for each exposure region and substantially perform the 3D fabrication without laminating the photosensitive material in the photo-fabrication apparatus 1. As a result, it is possible to easily fabricate a model having a desired 3D shape for a short time and reduce the manufacturing cost. Further, in the photo-fabrication apparatus 1, by adjusting the focus position of the spatially-modulated light beam to the reference position (in the photosensitive resist) of the photosensitive member 9, it is possible to perform light irradiation especially with high accuracy in height where high accuracy of shape is required.

Figure 6:
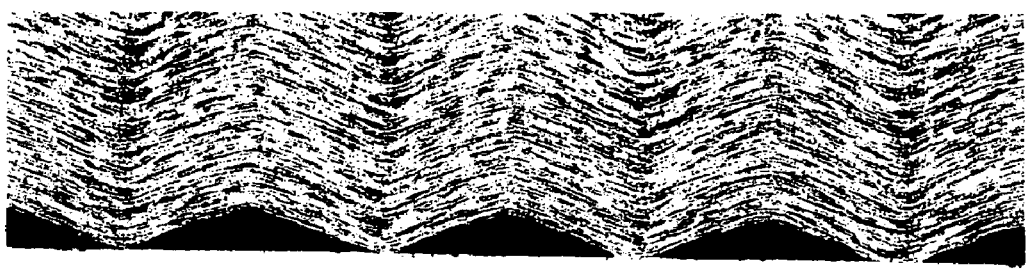
FIG. 6 is a view showing an example of fabricated model.

FIG. 6 is a view showing an exemplary model (3D surface) fabricated by exposure and development in the photo-fabrication apparatus 1. As shown in FIG. 6, the photo-fabrication apparatus 1 can fabricate a very small 3D model.

Figure 7A:
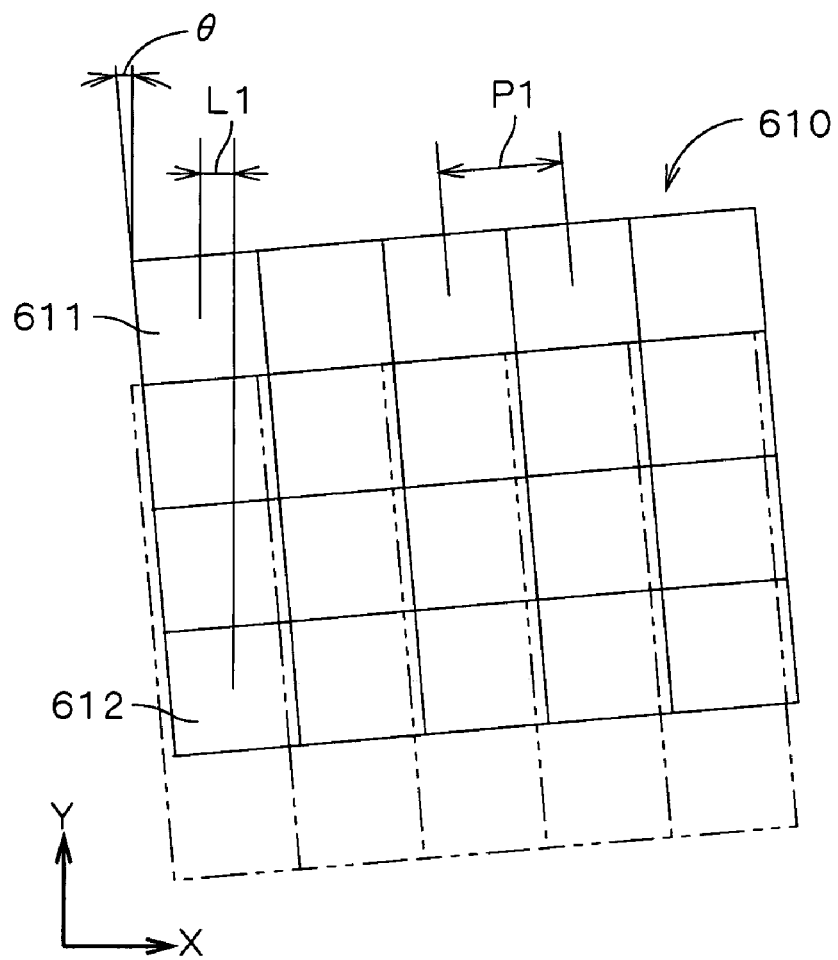
FIG. 7A is a view showing an irradiation region group on a photosensitive member in accordance with a second preferred embodiment.

Next discussion will be made on a photo-fabrication apparatus 1 in accordance with the second preferred embodiment. In the photo-fabrication apparatus 1 of the second preferred embodiment, the DMD 32 is inclined (rotated) inside the head part 3 in the photo-fabrication apparatus 1 of the first preferred embodiment, and the following discussion will be made by using the same reference signs as those in the first preferred embodiment. With the DMD 32 inclined, as shown in FIG. 7A, an array direction of an irradiation region group 610 (which corresponds to one block 321 in FIG. 2) on the photosensitive member 9 is inclined with respect to a relative movement direction (i.e., the Y direction of FIG. 7A). Though FIG. 7A shows that irradiation regions of the group 610 are arranged in four rows, in a practical case, more irradiation regions are arranged in both the row and column directions.

The inclination of the irradiation region group 610 in the relative movement direction is made so that an angle formed by one of two array directions of the irradiation region group 610 which goes almost along the relative movement direction (in other words, a direction which corresponds to the column direction of the DMD 32, and hereinafter referred to as "column direction") and the relative movement direction may be a predetermined angle of θ. At that time, a distance L1 between irradiation regions (represented by reference numerals 611 and 612 in FIG. 7A) on both ends in an column in a direction (in the X direction) orthogonal to the relative movement direction is made smaller than a pitch P1 of the irradiation regions in the group 610 in the row direction orthogonal to the column direction.

Figure 8:
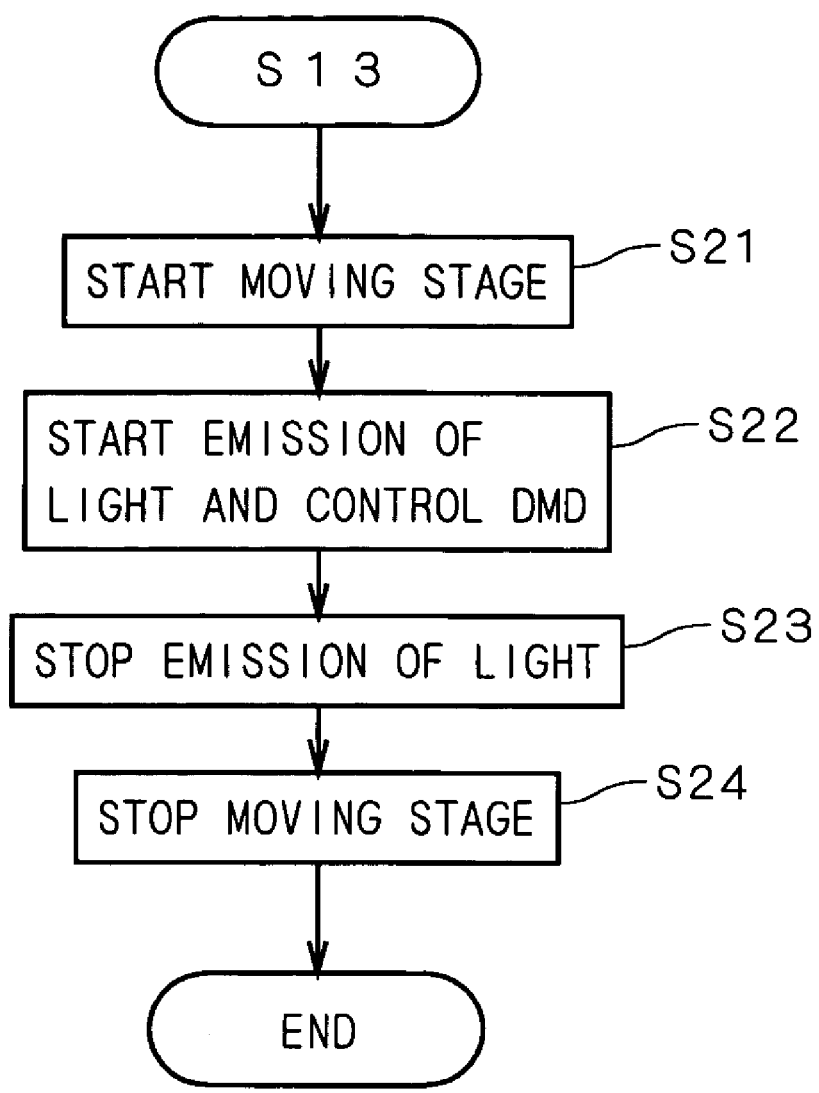
FIG. 8 is a flowchart showing an operation flow of exposure in accordance with the second preferred embodiment.

FIG. 8 is a flowchart showing an operation flow of exposure in the photo-fabrication apparatus 1 in accordance with the second preferred embodiment and shows the flow after Step S13 of FIG. 4. For convenience of discussion, it is assumed that the exposure should be performed only by one block 321 in which the micromirrors are arranged in four rows and m columns. Further, in the second preferred embodiment, the irradiation region group 610 is moved relatively to the photosensitive member 9 and exposure regions in the following discussion are regions fixed on the photosensitive member 9.

In the photo-fabrication apparatus 1, like in the first preferred embodiment, after Steps S11 to S13, the computer 5 controls the stage 2 to start moving in the (+Y) direction and the irradiation region group 610 thereby continuously moves in the (−Y) direction relatively to the photosensitive member 9 (Step S21). Then, the light source 31 starts emitting light and the DMD 32 is controlled in synchronization with the relative movement of the irradiation region group 610 to perform the exposure operation (Step S22).

FIGS. 9A to 9F are views for explanation of control of the DMD 32 in synchronization with the relative movement of the irradiation region group 610. FIGS. 9A to 9E show only the group 610 of irradiation regions arranged in one column, indicating the irradiation regions of ON state by solid lines and the irradiation regions of OFF state by broken lines. In FIGS. 9A to 9E, the irradiation regions are represented by reference signs 61a, 61b, 61c and 61d in this order from the (+Y) side and an exposure region group 620 fixed on the photosensitive member 9 is indicated by two-dot chain lines.

When the first DMD cell data from the computer 5 is written into the memory cells corresponding to the micromirrors and the irradiation region group 610 reaches a predetermined exposure start position on the photosensitive member 9, the computer 5 transmits the first reset pulse. The micromirrors of the DMD 32 are thereby inclined at respective tilt angles in accordance with the data in the memory cells to perform switching of ON/OFF of light irradiation for the corresponding irradiation regions. For example, as shown in FIG. 9A, only the irradiation region 61d is turned ON and the other irradiation regions 61a to 61c are turned OFF.

Immediately after the transmission of the reset pulse, the second DMD cell data is written in the memory cells corresponding to the micromirrors. The reset pulse is transmitted to the DMD 32 in synchronization with the operation for moving the stage 2 by the stage moving mechanism 41. Specifically, at the point of time when the irradiation region group 610 is moved by a pitch P2 in the relative movement direction of the exposure region group 620 after the first reset pulse, the second reset pulse is transmitted to the DMD 32 and the irradiation regions 61c and 61d are turned ON (or kept in ON state) and the irradiation regions 61a and 61b are kept in OFF state as shown in FIG. 9B.

Figure 9:
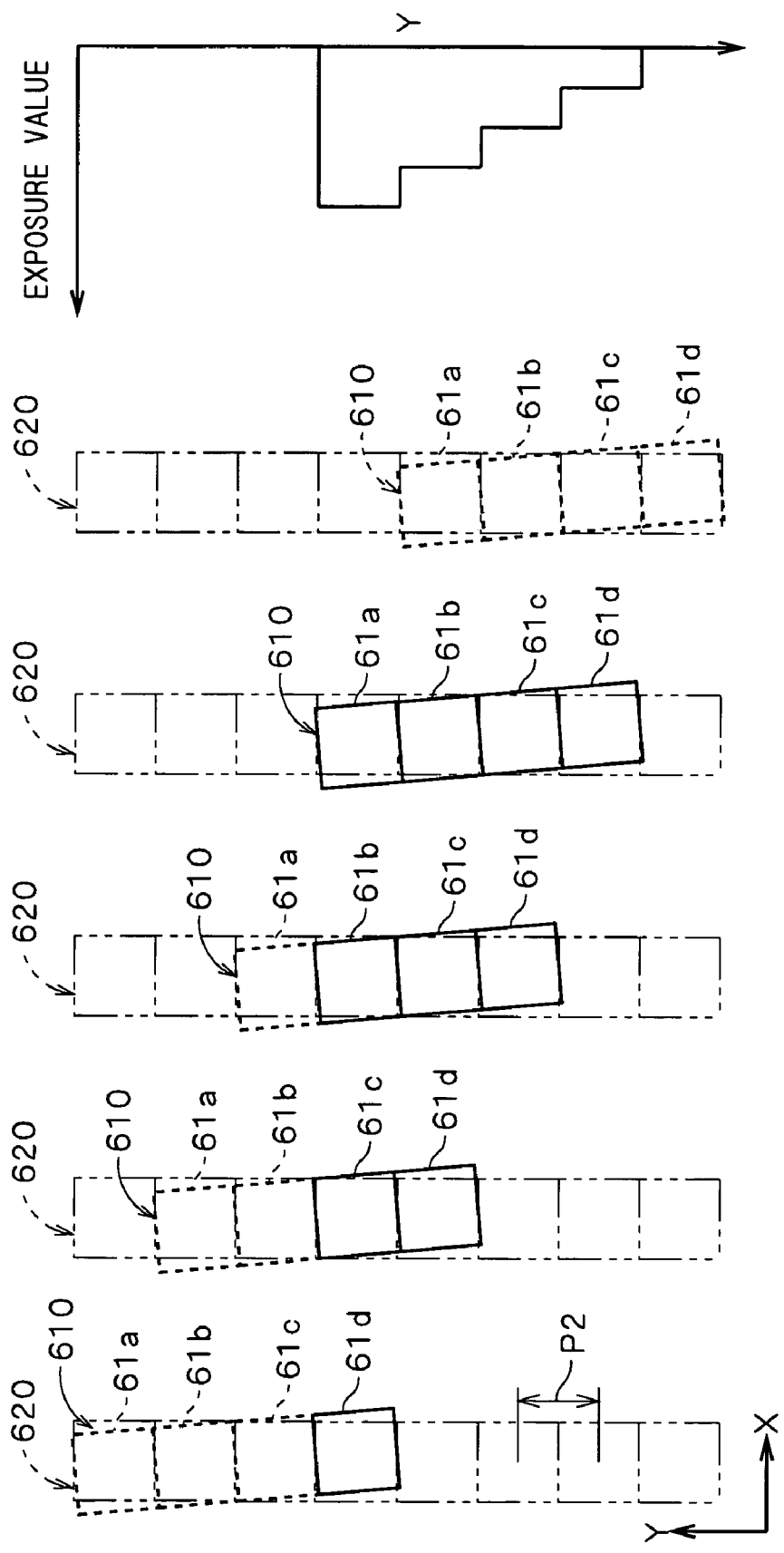
FIGS. 9A to 9E are views each showing an irradiation region group on the photosensitive member.
FIG. 9F is a view showing the cumulative quantity of light in the Y direction.

Subsequently, with transmission of the third reset pulse, the irradiation regions 61b to 61d are turned ON (or kept in ON state) as shown in FIG. 9C, and with transmission of the fourth reset pulse, all the irradiation regions 61a to 61d are turned ON (or kept in ON state) as shown in FIG. 9D. With transmission of the fifth reset pulse, all the irradiation regions 61a to 61d are turned OFF as shown in FIG. 9E. Thus, the light irradiation is overlappingly performed (in other words, multiple exposures are done) for one exposure region through a plurality of irradiation regions, and five-level exposure is achieved as shown in FIG. 9F. Since the irradiation region group 610 relatively moves, actually, the quantity of light shown in FIG. 9F changes more gently.

Figure 7B:
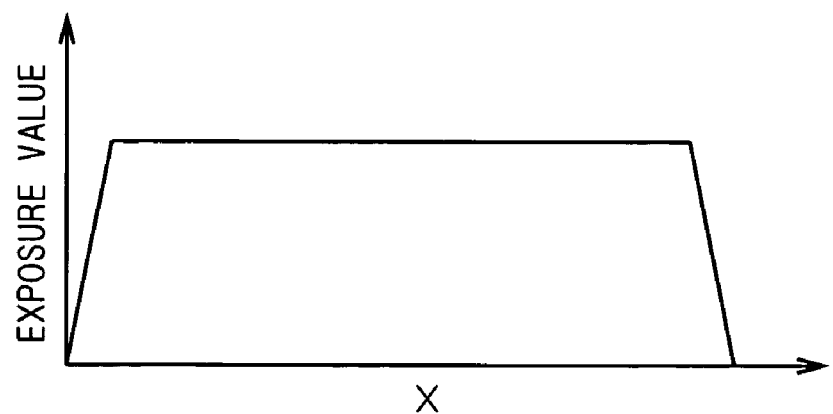
FIG. 7B is a view showing the cumulative quantity of light in the X direction.

At that time, if the column direction of the irradiation region group 610 is parallel to the relative movement direction and there are very small spaces between respective two adjacent micromirrors in the DMD 32, there are regions not irradiated with light between respective two adjacent columns of irradiation regions. In the photo-fabrication apparatus 1 of the second preferred embodiment, however, since the irradiation region group 610 continuously moves relatively, being inclined, as shown in FIG. 7A, when all of the micromirrors are in ON state, the cumulative quantity of light has almost constant distribution in the X direction as shown in FIG. 7B. Therefore, it is possible to appropriately irradiate even the spaces between respective two adjacent exposure regions in the X direction.

After the irradiation region group 610 passes the last exposure region on the (−Y) side, emission of light from the light source 31 is stopped (Step S23) and the stage 2 stops moving (Step S24). When the width of the exposure region group in the X direction is large, the exposure operation is repeated by a stepping movement (i.e., subscan) of the irradiation region group 610 and after that, Steps S23 and S24 are performed. After the exposure is finished, like in the first preferred embodiment, the photosensitive resist of the photosensitive member 9 is developed and a 3D model is thereby completed.

Thus, in the photo-fabrication apparatus 1 of the second preferred embodiment, the cumulative quantity of irradiation light is controlled, which is emitted to one exposure region defined on the photosensitive member 9 through a plurality of irradiation regions which pass the exposure region as the group 610 of irradiation regions each of which corresponds to an element of modulation is moved relatively to the photosensitive member 9. It is thereby possible to perform an overlapping exposure for one exposure region with light through a plurality of irradiation regions, and this achieves a multi-level exposure (multiple exposures). Further, by using only the minimum rows of micromirrors for exposure, the number of active blocks 321 is reduced and the time for writing of data into the memory cells can be thereby shortened. As a result, it is possible to perform a wide-range exposure on the photosensitive member 9 with high accuracy for a short time.

In the photo-fabrication apparatus 1, since the distance between the irradiation regions on both ends in a column of the irradiation region group 610 in a direction orthogonal to the relative movement direction of the irradiation regions is made smaller than the pitch of the irradiation regions in the group 610 in the row direction, it is possible to control the DMD 32 as easily as the case where the DMD 32 is not inclined and suppress the ill effect on the shape of the fabricated model due to the spaces between the respective two micromirrors.

Figure 10:
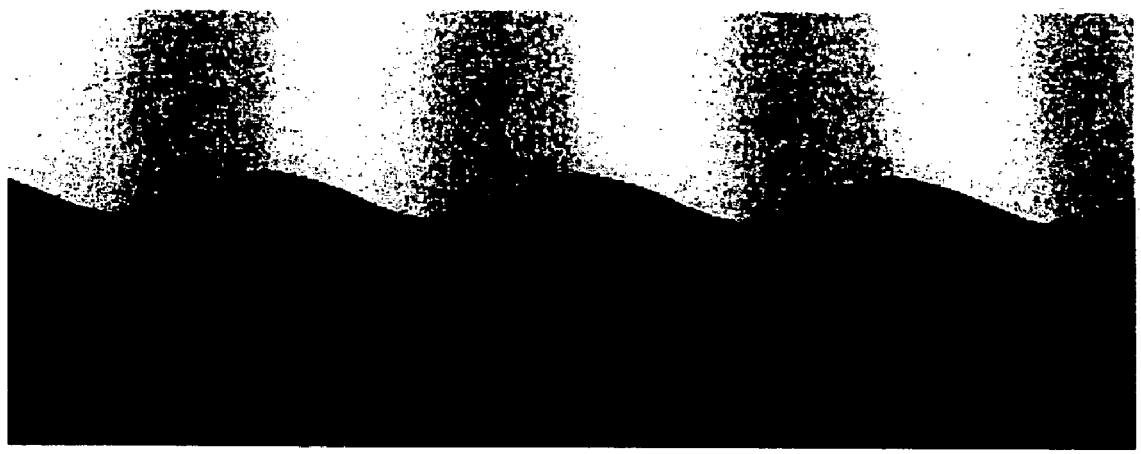
FIG. 10 is a view showing an example of fabricated model.

FIG. 10 is a view showing an example of model (3D surface) fabricated by an exposure operation in the photo-fabrication apparatus 1 in accordance with the second preferred embodiment and development after that. As shown in FIG. 10, the photo-fabrication apparatus 1 can fabricate a very smooth 3D model with high accuracy.

When the spaces between the respective two columns in the DMD 32 is enough small not to affect the exposure, it is not necessary to incline the irradiation region group 610 from the scan direction. On the other hand, when it is not necessary to control the exposed depth with high accuracy between adjacent exposure regions (or the exposed depth is not changed considerably), the DMD 32 may be inclined so that the distance between the irradiation regions on both ends in a column of the irradiation region group 610 in the direction orthogonal to the relative movement direction of the irradiation regions can be made larger than the pitch of the irradiation regions in the group 610 in the row direction.

The photo-fabrication apparatus 1 of the second preferred embodiment can perform a higher-degree exposure for 3D fabrication by combination of the multi-level exposure of the first preferred embodiment and the multiple exposures. FIGS. 11A to 11F are views each showing another example of exposure operation, and FIGS. 11A to 11E show the movement of the irradiation region group 610 relative to the photosensitive member 9, like FIGS. 9A to 9E. The types of hatch lines in the irradiation regions represent the levels (herein, five levels) of exposure and denser hatch represents larger exposure values. The irradiation regions of OFF state are indicated by broken lines.

In the exposure operation of FIGS. 11A to 11E, the transmissions of the reset pulse is repeated a predetermined number of times while the irradiation region group 610 is moved by the pitch P2 after the first reset pulse, and the tilt angles of the micromirrors are thereby changed at high speed in accordance with the DMD cell data corresponding to the respective reset pulses. Thus, while the irradiation region group 610 is moved by the pitch P2, multi-level light irradiation of each irradiation region is performed. By appropriately dispersing the moments when each micromirror turns ON, it is possible to suppress inconsistencies in exposure while the irradiation region group 610 is relatively moving.

Figure 11:
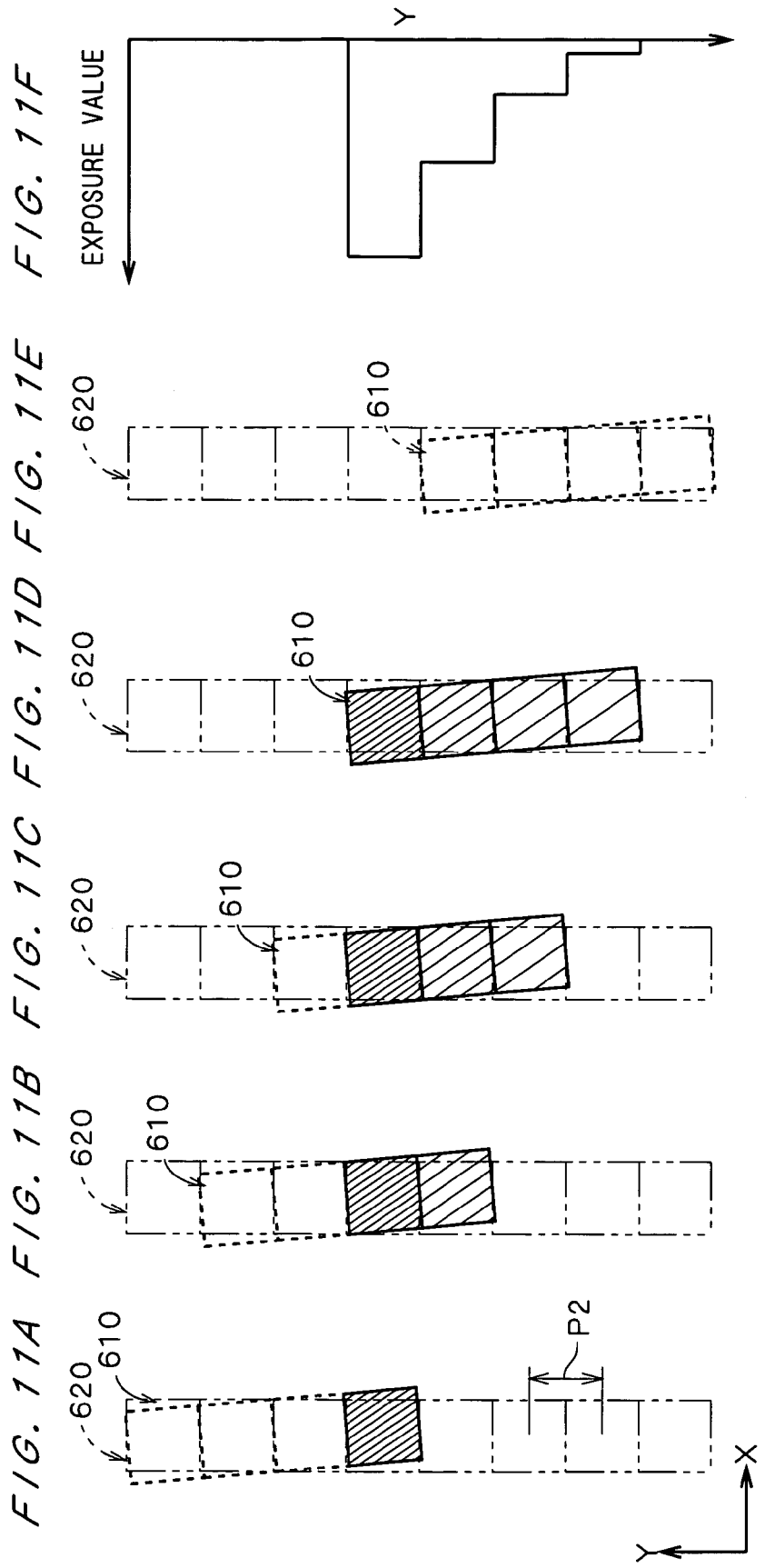
FIGS. 11A to 11E are views each showing an irradiation region group on a photosensitive member.
FIG. 11F is a view showing the cumulative quantity of light in the Y direction.

As shown in FIGS. 11A to 11E, with combination of the multi-level light irradiation and the multiple exposures by controlling levels of each irradiation region in synchronization with the relative movement of the irradiation region group 610, it is possible to perform a multi-level exposure where the number of exposure levels is larger than that of levels of each micromirror in the DMD 32 as shown in FIG. 11F.

Figure 12:
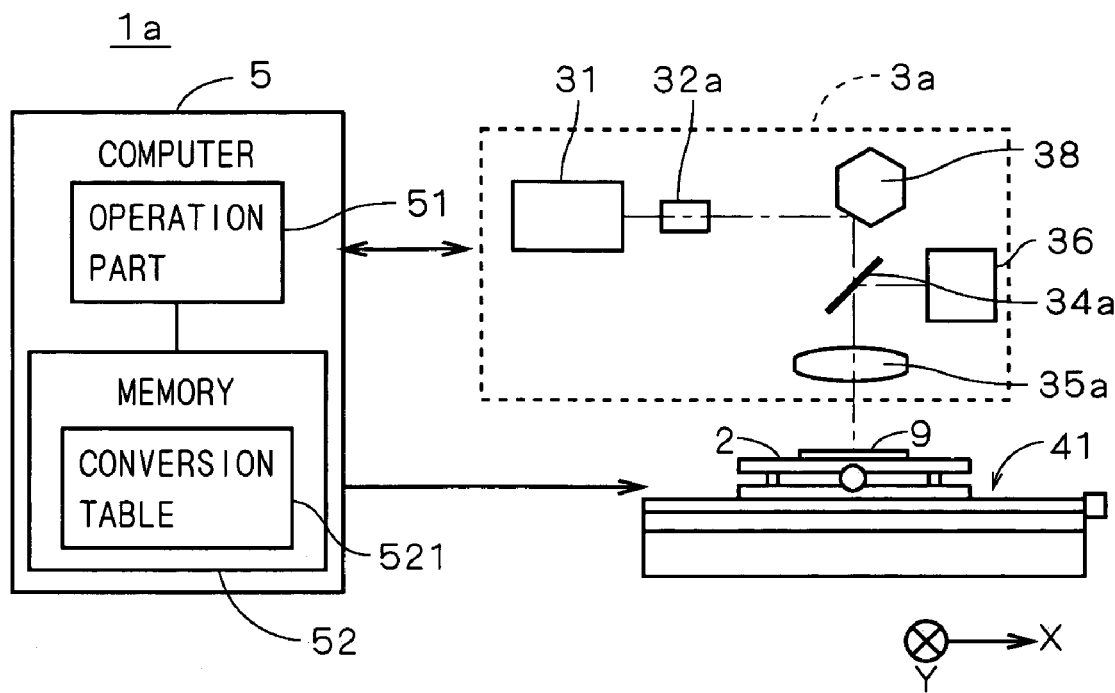
FIG. 12 is a view showing a construction of a photo-fabrication apparatus in accordance with a third preferred embodiment.

FIG. 12 is a view showing a construction of a photo-fabrication apparatus 1a in accordance with the third preferred embodiment. The photo-fabrication apparatus 1a has a head part 3a which is a unit for emitting a modulated light beam while moving the irradiation position and only in this constitution, the photo-fabrication apparatus 1a is different from the photo-fabrication apparatus 1 of FIG. 1. Other constituent elements of the photo-fabrication apparatus 1a are the same as those of FIG. 1 and are represented by the same reference signs.

In the head part 3a of the photo-fabrication apparatus 1a, a light beam emitted from the light source 31 having a semiconductor laser is modulated by a light modulator element 32a (in other words, the intensity of the light beam is changed) and the modulated light beam is guided to a polygon mirror 38. The polygon mirror 38 is rotated by a motor (not shown) having an encoder and an output from the encoder is inputted to the computer 5. The light beam reflected on the rotating polygon mirror 38 is guided to the photosensitive member 9 with scanning in the X direction of FIG. 12 through a half mirror 34a and a scanning lens group 35a.

When the photo-fabrication apparatus 1a performs an exposure for 3D fabrication, the exposure value for each exposure region is obtained by the operation part 51 on the basis of shape data of a designed object, which is prepared in advance, and the conversion table 521 stored in the memory 52, and a distance between the head part 3a and the photosensitive member 9 is controlled (Steps S11 to S13 of FIG. 4) like in photo-fabrication apparatus 1 of FIG. 1. Subsequently, the stage 2 starts moving and the photosensitive member 9 is moved by the stage moving mechanism 41 in the Y direction (Step S21 of FIG. 8). Then, the computer 5 controls the motor of the polygon mirror 38, the light modulator element 32a and the stage moving mechanism 41 in synchronization, and the light irradiation region on the photosensitive member 9 is thereby moved in the X direction and Y direction and the intensity of light is changed by the light modulator element 32a. This makes it possible to perform a multi-level exposure for the exposure region group on the photosensitive member 9 at high speed (Step S22). After that, emission of light and movement of the stage 2 are stopped (Steps S23 and S24) and the photosensitive resist of the photosensitive member 9 is developed, to complete a 3D model.

Thus, in the photo-fabrication apparatus 1a, the irradiation region for light emitted from a light source unit comprising the light source 31 and the light modulator element 32a is moved relatively to the photosensitive member 9 while the light source unit is controlled in synchronization with the relative movement of the irradiation region. Therefore, in the photo-fabrication apparatus 1a, it is possible to perform an exposure for 3D fabrication with high accuracy at high speed in a wide range on the photosensitive member 9 and as a result, a 3d model can be fabricated for a short time with high accuracy. There may be a case where a modulated light beam is emitted from the light source unit by controlling the output of the semiconductor laser of the light source 31 and so on. Further, the scan of the irradiation region may be performed by other techniques using a galvanomirror or other deflectors.

Though the preferred embodiments of the present invention have been discussed above, the present invention is not limited to the above-discussed preferred embodiments, but allows various variations.

Figure 13:
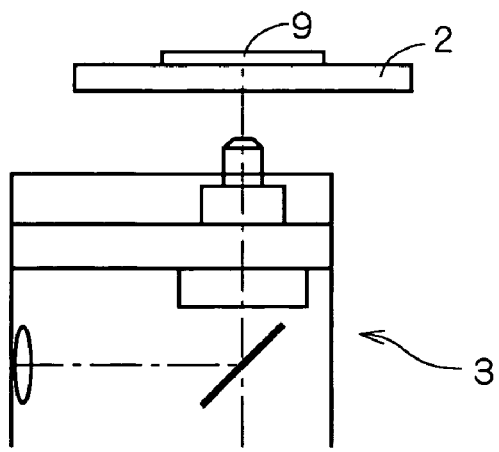
FIG. 13 is a view showing an exposure of a photosensitive member with a stage interposed.

The photosensitive resist is not limited to a positive-type one but a negative-type photosensitive resist may be used. In a case of using the negative-type photosensitive resist, a photosensitive member 9 which is obtained by coating a glass substrate with photosensitive resist is prepared and the photosensitive member 9 is placed on a stage 2 formed of glass with the photosensitive resist of the photosensitive member 9 upward as shown in FIG. 13. The spatially-modulated light beam from the head part 3 is guided to the photosensitive resist through the stage 2 and the glass substrate, to perform an exposure for 3D fabrication. Then, the photosensitive resist having unevenness in accordance with the exposure values remains after development.

The photosensitive material of the photosensitive member 9 is not limited to the photosensitive resist coating the substrate but other photosensitive resins or the like may be used.

The spatial light modulator in the photo-fabrication apparatus is not limited to the DMD 32 but may be a diffraction grating type spatial light modulator (GLV (registered trademark): Grating Light Valve). Further, there may be a case where a plurality of light emitting diodes or the like serving as a light source are arranged in a two-dimensional array and an exposure is performed by controlling ON/OFF of each light emitting diode in synchronization with the relative movement of the irradiation regions while an array direction of the irradiation region group corresponding to a group of light emitting diodes is inclined with respect to the relative movement direction.

The conversion table 521 does not necessarily represent a relation between the quantity of irradiation light for an exposure region and the exposed depth but only has to substantially represent a relation between the quantity of irradiation light for one exposure region and the depth of the photosensitive material to be exposed.

The relative movement of the stage 2 and the head part 3 (in other words, the relative movement of the photosensitive member 9 and the irradiation region group) may be performed by a moving mechanism provided in the head part 3. The mechanism for changing the distance between the position where luminous fluxes corresponding to the irradiation regions are focused and the surface of the photosensitive member 9 is not limited to the stage up-and-down mechanism 44 but may be a mechanism provided in the head part 3 for changing the focus position.

The photo-fabrication apparatus of the above-discussed preferred embodiments can be used for fabrication of physical models of various shapes and is especially suitable for fabrication of shapes having very small periodic projections and depressions.

While the invention has been shown and described in detail, the foregoing description is in all aspects illustrative and not restrictive. It is therefore understood that numerous modifications and variations can be devised without departing from the scope of the invention.

What is claimed is:

1. A photo-fabrication apparatus for performing three-dimensional fabrication by irradiating a photosensitive material with light, comprising:
   a light source;
   a spatial light modulator having a plurality of micromirrors arranged in a two-dimensional array, for spatially modulating light received from said light source by individually changing tilt angles of said plurality of micromirrors;
   a holding part for holding a photosensitive material to be irradiated with light which is spatially modulated by said spatial light modulator; and
   a controller for controlling tilt angles of said plurality of micromirrors to control a quantity of irradiation light for each of a group of irradiation regions on said photosensitive material among more than two levels and obtain an exposed depth of said photosensitive material at said each of said group of irradiation regions in accordance with a cumulative quantity of irradiation light emitted thereto, said group of irradiation regions corresponding to said plurality of micromirrors and being fixed onto said photosensitive material.

2. The photo-fabrication apparatus according to claim 1, further comprising
a mechanism for changing a distance between a position where luminous fluxes going toward said group of irradiation regions are focused and a surface of said photosensitive material.

3. The photo-fabrication apparatus according to claim 1, wherein
said controller comprises
a memory for storing shape data on a three-dimensional shape of an object and a table substantially indicating a relation between a quantity of irradiation light for one exposure region on a photosensitive material and an exposed depth of said photosensitive material; and
an electronic circuit for obtaining a quantity of irradiation light for each of exposure regions defined on said photosensitive material, which is an element of exposure, on the basis of said shape data and said table.

4. The photo-fabrication apparatus according to claim 3, further comprising
a measuring device,
wherein a plurality of exposure regions are irradiated with light of different exposure values and said measuring device measures heights of a photosensitive material which is developed after irradiation, at said plurality of exposure regions, and
said controller makes said table on the basis of said exposure values and said heights of photosensitive material at said plurality of exposure regions.

5. A photo-fabrication apparatus for performing three-dimensional fabrication by irradiating a photosensitive material with light, comprising:
a spatial light modulator for generating spatially-modulated light;
a holding part for holding a photosensitive material to be irradiated with light which is spatially modulated by said spatial light modulator;
a moving mechanism for moving a group of irradiation regions on a photosensitive material relatively to said photosensitive material, each of said group of irradiation regions corresponding to an element of modulation; and
a controller for controlling said spatial light modulator in synchronization with a relative movement of said group of irradiation regions to control a cumulative quantity of irradiation light emitted to each of exposure regions defined on said photosensitive material among more than two levels while a plurality of irradiation regions pass said each of exposure regions, to obtain an exposed depth of said photosensitive material at said each of exposure regions in accordance with said cumulative quantity of irradiation light.

6. The photo-fabrication apparatus according to claim 5, wherein
said group of irradiation regions are arranged in a two-dimensional array and a relative movement direction of said group of irradiation regions goes almost along one array direction.

7. The photo-fabrication apparatus according to claim 6, wherein
said group of irradiation regions are arranged at regular intervals in two directions which are orthogonal to each other and a distance in a direction orthogonal to said relative movement direction between irradiation regions on both ends in a row along said one array direction is smaller than a pitch of said group of irradiation regions in the other array direction.

8. The photo-fabrication apparatus according to claim 5, wherein
said spatial light modulator has a plurality of micromirrors and spatially modulates light received from a light source by individually changing tilt angles of said plurality of micromirrors.

9. The photo-fabrication apparatus according to claim 5, further comprising
a mechanism for changing a distance between a position where luminous fluxes going toward said group of irradiation regions are focused and a surface of said photosensitive material.

10. The photo-fabrication apparatus according to claim 5, wherein
said controller comprises
a memory for storing shape data on a three-dimensional shape of an object and a table substantially indicating a relation between a quantity of irradiation light for one exposure region on a photosensitive material and an exposed depth of said photosensitive material; and
an electronic circuit for obtaining a quantity of irradiation light for each of exposure regions defined on said photosensitive material, which is an element of exposure, on the basis of said shape data and said table.

11. The photo-fabrication apparatus according to claim 10, further comprising
a measuring device,
wherein a plurality of exposure regions are irradiated with light of different exposure values and said measuring device measures heights of a photosensitive material which is developed after irradiation, at said plurality of exposure regions, and
said controller makes said table on the basis of said exposure values and said heights of photosensitive material at said plurality of exposure regions.

12. A photo-fabrication apparatus for performing three-dimensional fabrication by irradiating a photosensitive material with light, comprising:
a light source unit for emitting modulated light;
a holding part for holding a photosensitive material to be irradiated with light from said light source unit;
a moving mechanism for moving an irradiation region irradiated with light emitted from said light source unit relatively to a photosensitive material; and
a controller for controlling said light source unit in synchronization with a relative movement of said irradiation region to control a cumulative quantity of irradiation light for each of exposure regions defined on said photosensitive material among more than two levels and obtain an exposed depth of said photosensitive material at said each of exposure regions in accordance with said cumulative quantity of irradiation light.

13. The photo-fabrication apparatus according to claim 12, further comprising
a mechanism for changing a distance between a position where a luminous flux going toward said irradiation region is focused and a surface of said photosensitive material.

14. The photo-fabrication apparatus according to claim 13, wherein
said controller comprises
a memory for storing shape data on a three-dimensional shape of an object and a table substantially indicating a relation between a quantity of irradiation light for one exposure region on a photosensitive material and an exposed depth of said photosensitive material; and an electronic circuit for obtaining a quantity of irradiation light for each of exposure regions defined on said photosensitive material, which is an element of exposure, on the basis of said shape data and said table.

15. The photo-fabrication apparatus according to claim 14, further comprising
a measuring device,
wherein a plurality of exposure regions are irradiated with light of different exposure values and said measuring device measures heights of a photosensitive material which is developed after irradiation, at said plurality of exposure regions, and
said controller makes said table on the basis of said exposure values and said heights of photosensitive material at said plurality of exposure regions.

* * * * *